United States Patent
Hughes et al.

(10) Patent No.: US 9,146,351 B2
(45) Date of Patent: Sep. 29, 2015

(54) LOOPBACK HOUSING FOR A FIBER OPTIC CONNECTOR

(75) Inventors: Mike Elbert Hughes, Hickory, NC (US); Jillcha Fekadu Wakjira, Hickory, NC (US); Darrell Randolph Childers, Hickory, NC (US); John H. Fox, Haledon, NJ (US); Yefim Gorelik, Wayne, NJ (US)

(73) Assignee: US Conec, Ltd, Hickory, NC (US)

( * ) Notice: Subject to any disclaimer, the term of this patent is extended or adjusted under 35 U.S.C. 154(b) by 408 days.

(21) Appl. No.: 13/543,810

(22) Filed: Jul. 7, 2012

(65) Prior Publication Data

US 2013/0183004 A1 Jul. 18, 2013

Related U.S. Application Data

(60) Provisional application No. 61/506,011, filed on Jul. 8, 2011.

(51) Int. Cl.
*G02B 6/24* (2006.01)
*G02B 6/38* (2006.01)

(52) U.S. Cl.
CPC .............. *G02B 6/241* (2013.01); *G02B 6/3827* (2013.01); *G02B 6/3869* (2013.01); *G02B 6/3895* (2013.01); *G02B 6/3897* (2013.01)

(58) Field of Classification Search
CPC ...................................................... G02B 6/3827
See application file for complete search history.

(56) References Cited

U.S. PATENT DOCUMENTS

| | | | |
|---|---|---|---|
| 6,707,979 B2 * | 3/2004 | Wang et al. | 385/140 |
| 7,330,624 B2 * | 2/2008 | Isenhour et al. | 385/134 |
| 7,596,293 B2 * | 9/2009 | Isenhour et al. | 385/134 |
| 7,630,610 B2 * | 12/2009 | Cobb et al. | 385/139 |
| 8,511,911 B2 * | 8/2013 | Ott et al. | 385/78 |
| 8,801,299 B2 * | 8/2014 | Shimotsu et al. | 385/77 |
| 2003/0063862 A1 * | 4/2003 | Fillion et al. | 385/53 |
| 2008/0131056 A1 * | 6/2008 | Isenhour et al. | 385/71 |

* cited by examiner

*Primary Examiner* — Michelle R Connelly
*Assistant Examiner* — John M Bedtelyon
(74) *Attorney, Agent, or Firm* — Michael L. Leetzow, P.A.

(57) ABSTRACT

A loopback housing has an upper body portion and a lower body portion that are removably connected to one another. One of the body portions has a fiber opening to protect the optical fibers that are looped around for the fiber optic connector. The loopback housing also functions to remove and insert the fiber optic connector into an adapter, particularly in a high density application.

14 Claims, 7 Drawing Sheets

LOOPBACK HOUSING FOR A FIBER OPTIC CONNECTOR

REFERENCE TO RELATED CASE

This application claims priority under 35 U.S.C. §119(e) to provisional application Ser. No. 61/506,011, filed on Jul. 8, 2011, which is hereby incorporated by reference in its entirety.

BACKGROUND OF THE INVENTION

1. Field of the Invention

In the fiber optic industry, a loopback refers to the testing of the transmission of digital data streams from the origination point to a particular point and then back to the point of origination. This generally requires a fiber optic connector that has optical fibers with both ends secured in the same fiber optic connector. The optical fibers extend out of the connector and then "loopback" into the fiber optic connector. These optical fibers must be protected during use and they cannot be routed back in a too-tight circle or the optical fibers may break or crack, interfering with the transmission of light down the optical fibers. In certain applications, the loopback connectors are used in a high density application, making the insertion and removal of the loopback connector difficult because the optical fibers potentially protruding from the rear of the fiber optic connectors.

Thus, a new housing has been devised that allows the connectors to be inserted and removed from a high density application while providing protection and sufficient area for the optical fibers to be routed without breaking.

2. Summary of the Invention

The present invention is directed to a loopback housing to be attached to an outer portion of a fiber optic connector to protect optical fibers extending from a rear portion of the fiber optic connector, the optical fibers having two ends, both of the ends of the optical fibers terminating within the fiber optic connector, and the fiber optic connector having an inner sleeve and an outer sleeve, the inner and outer sleeves being movable relative to one another, including an upper body portion having an internal surface, an external surface, a front end, and back end, a lower body portion connectable to the upper body portion and having an internal surface, an external surface, a front end, and back end, at least one interior extension extending from the interior surface of at least one of the upper body portion and the lower body portion to engage the inner sleeve of the fiber optic connector, at least one of the upper body portion and the lower body portion having at least one rearward facing surface to engage the outer sleeve of the fiber optic connector, and a handle extending from a portion of the housing away from the front end and beyond the back end of the upper body portion and lower body portion.

In some embodiments, the upper body portion and the lower body portion are removably connectable to one another.

In other embodiments, the upper body portion has an inward extending portion disposed adjacent the back end, the handle emanates from the inward extending portion and away from the loopback housing.

In yet other embodiments, the loopback housing slides forward and backward relative to the fiber optic connector.

Additional features and advantages of the invention will be set forth in the detailed description which follows and, in part, will be readily apparent to those skilled in the art from that description or recognized by practicing the invention as described herein, including the detailed description, the claims, and the appended drawings.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
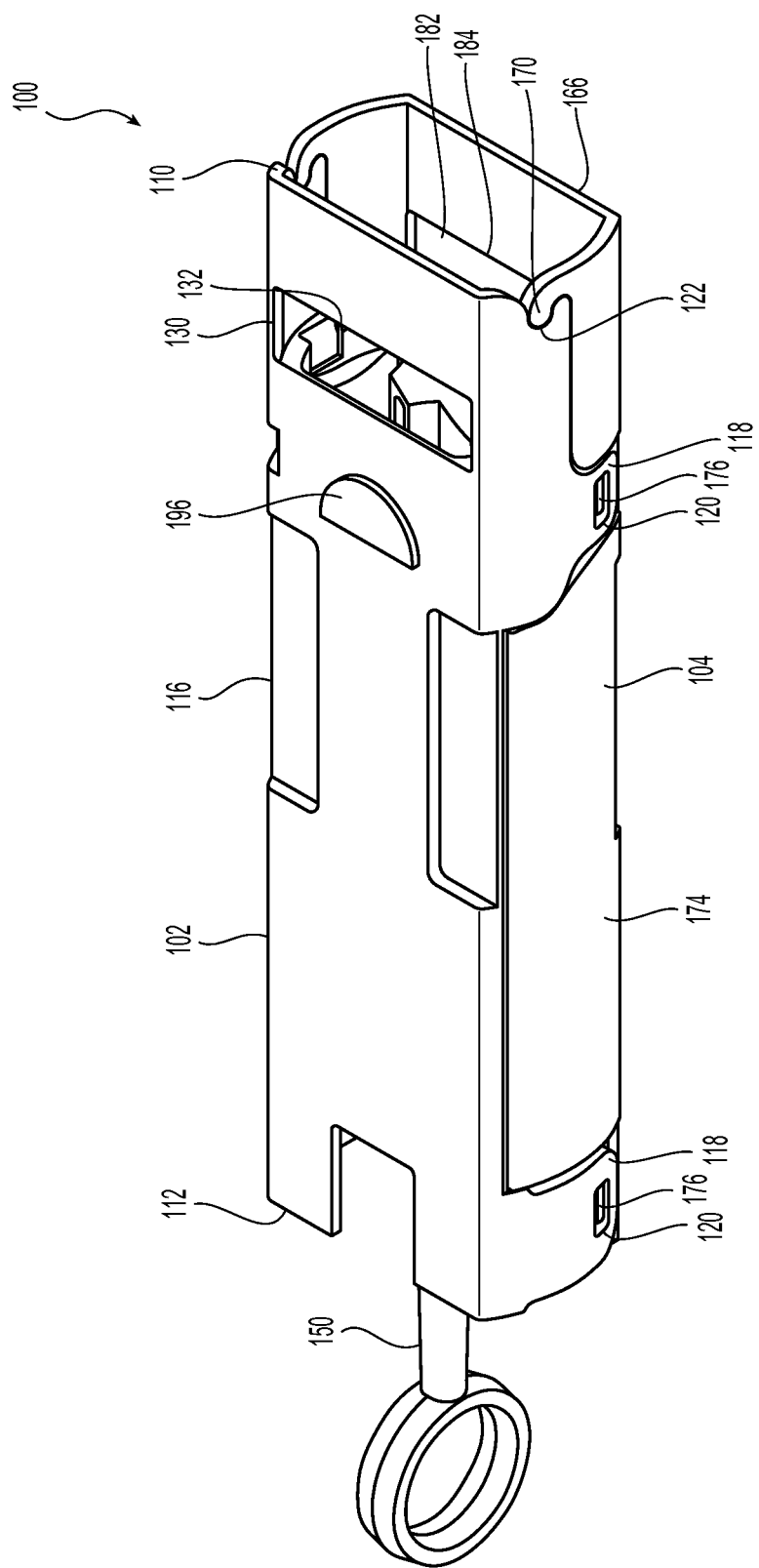
FIG. 1 is a perspective view of one embodiment of a loopback housing for a fiber optic connector according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
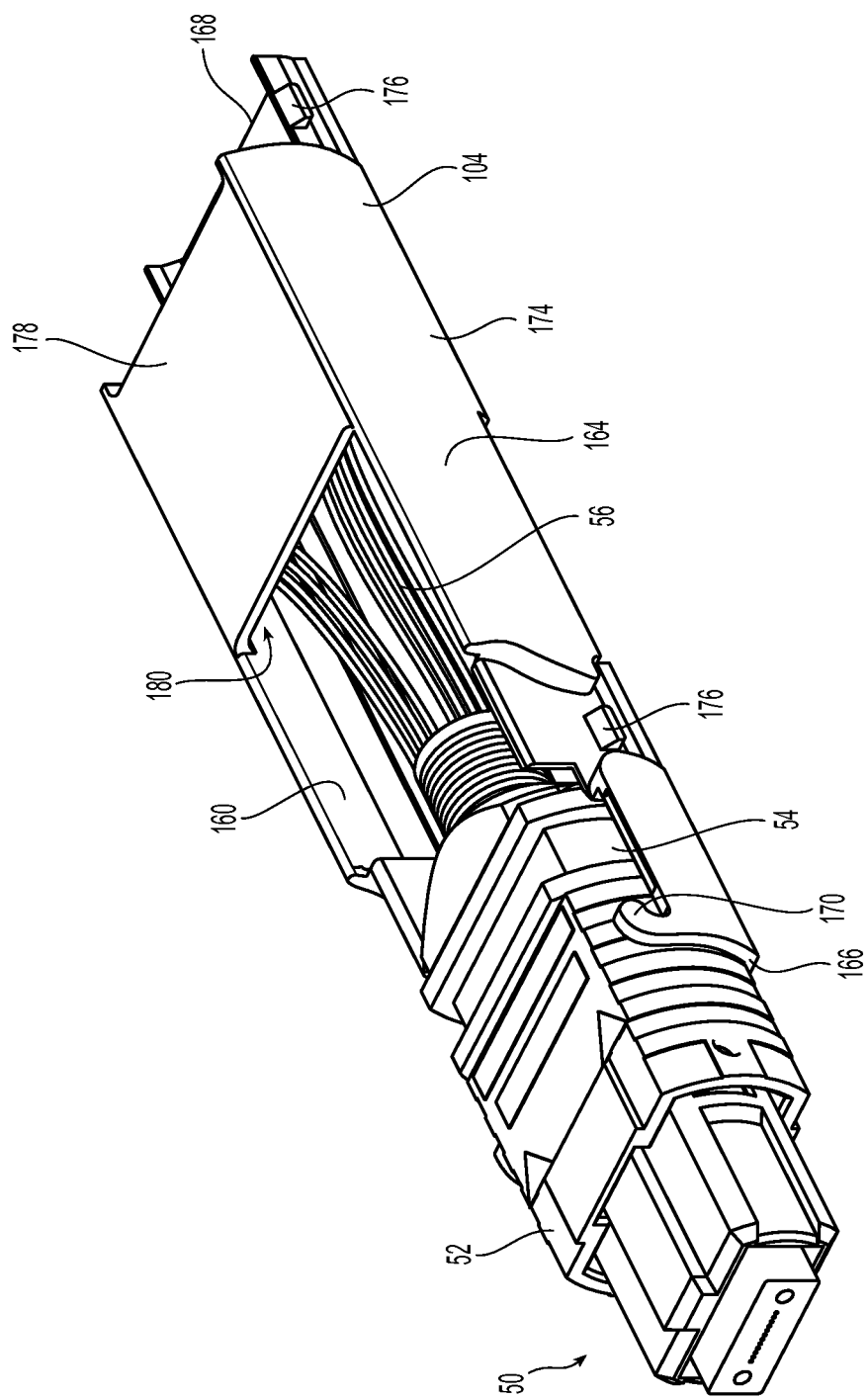
FIG. 2 is a perspective view of the lower body portion of the loopback housing of FIG. 1 with a fiber optic connector in the lower body portion.

One embodiment of a fiber optic connector 50 is illustrated in FIG. 2. The fiber optic connector 50 has an outer sleeve or housing 52 that is movable along a portion of the length of the fiber optic connector 50 relative to an inner sleeve or housing 54. The fiber optic connector 50 has a plurality of optical fibers 56 with two ends. Both of the ends of the optical fibers are secured in the fiber optic connector 50 for the loopback testing. The optical fibers 56 are relatively fragile, particularly when they are bent in a radius that is smaller than their bend radius of 4.6 mm (in the case of fiber optic ribbons). If that happens, the optical fibers 56 cannot (or at least not as efficiently) transmit signals and the fiber optic connector 50 becomes useless. This is particularly troubling where the testing must be done in a high density population. In a high density population area, there must be an easy way to insert and remove the fiber optic connector 50 and it cannot be by pulling on the optical fibers. A loopback housing 100 that protects the optical fibers and assists in inserting and removing the fiber optic connector is presented.

A loopback housing 100 has an upper body portion 102 and a lower body portion 104. The upper body portion 102 has a front end 110, a back end 112, an internal surface 114, and an external surface 116. The upper body portion 102 has two sets of downward projecting tabs 118. The sets of downward projecting tabs (or side portions) 118 have openings 120 to engage projections on a corresponding area on the lower body portion as described in more detail below. The front end 110 of the upper body portion 102 has indentations 122 on one of the two downward projecting tabs/side portions 118. The indentations correspond to projections on the lower body portion 104 and assist in aligning and mating the upper body portion 102 and the lower body portion 104 as described more below. The indentations 122 may also be provided on their own downward projecting tabs/side portions 118 adjacent the front end 110.

The upper body portion 102 has an opening 130 adjacent the front end. The position of the opening 130 in upper body portion 102 corresponds to the outer housing 52 and particularly an upward projection portion 58 of the outer housing 52. The opening 130 has a rearward facing surface 132 that engages the upward projection portion 58 of the outer housing 52 when the loopback housing 100 is pulled since the loopback housing moves relative to the fiber optic connector 50 and the outer housing 52. The rearward movement of the outer housing 52 allows the fiber optic connector to be removed from an adapter. The rearward facing surface 132 need not be associated with an opening 130 as illustrated. Rather, it could project from the internal surface 114 as a rib, a point, or be in any other form to engage and push on the the upward projection portion 58 of the outer housing 52.

Figures 4, 5:
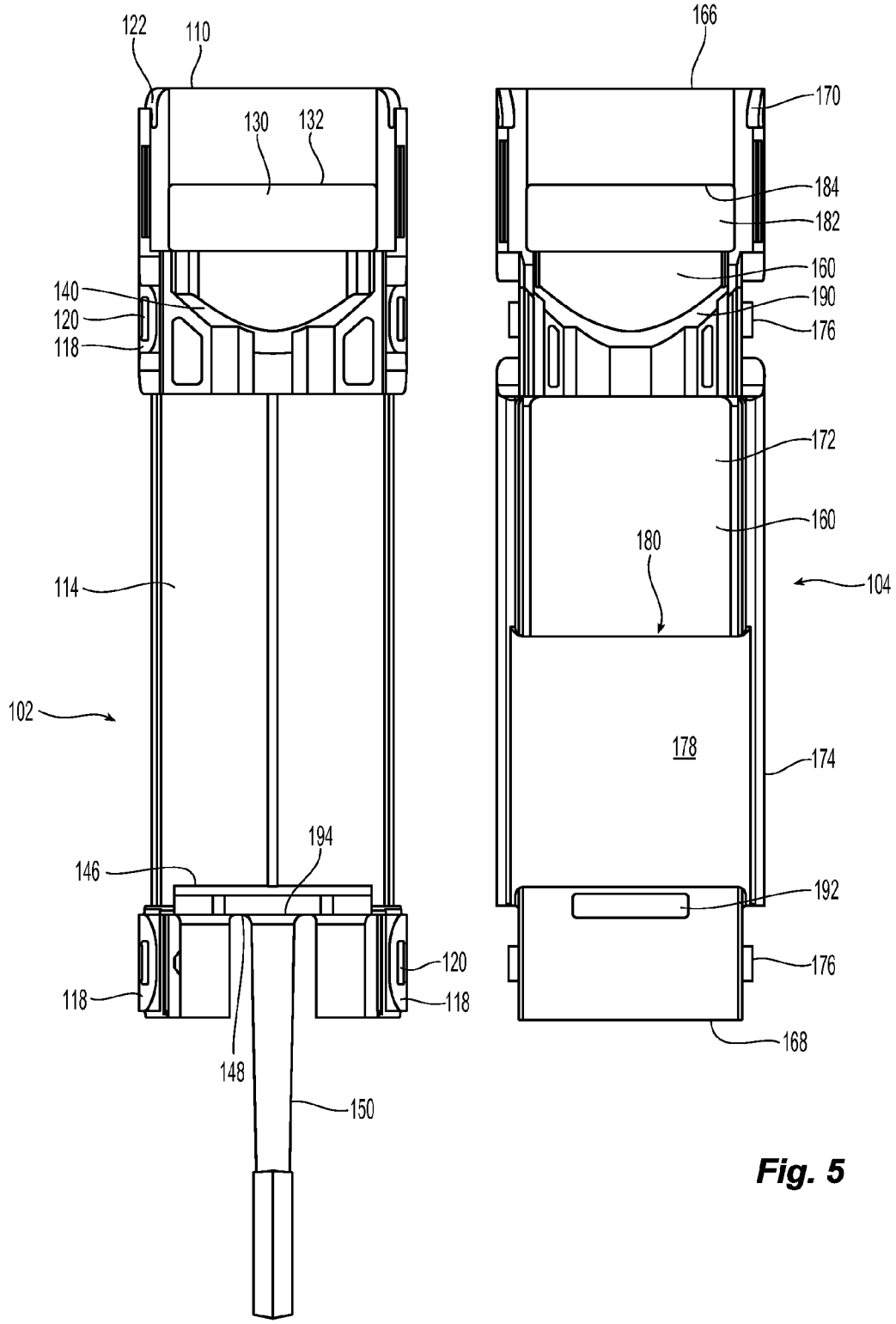
FIG. 4 is a planar view of the inside of the upper body portion of the loopback housing of FIG. 1.
FIG. 5 is planar view of the inside of the lower body portion of the loopback housing of FIG. 1.
Figure 6:
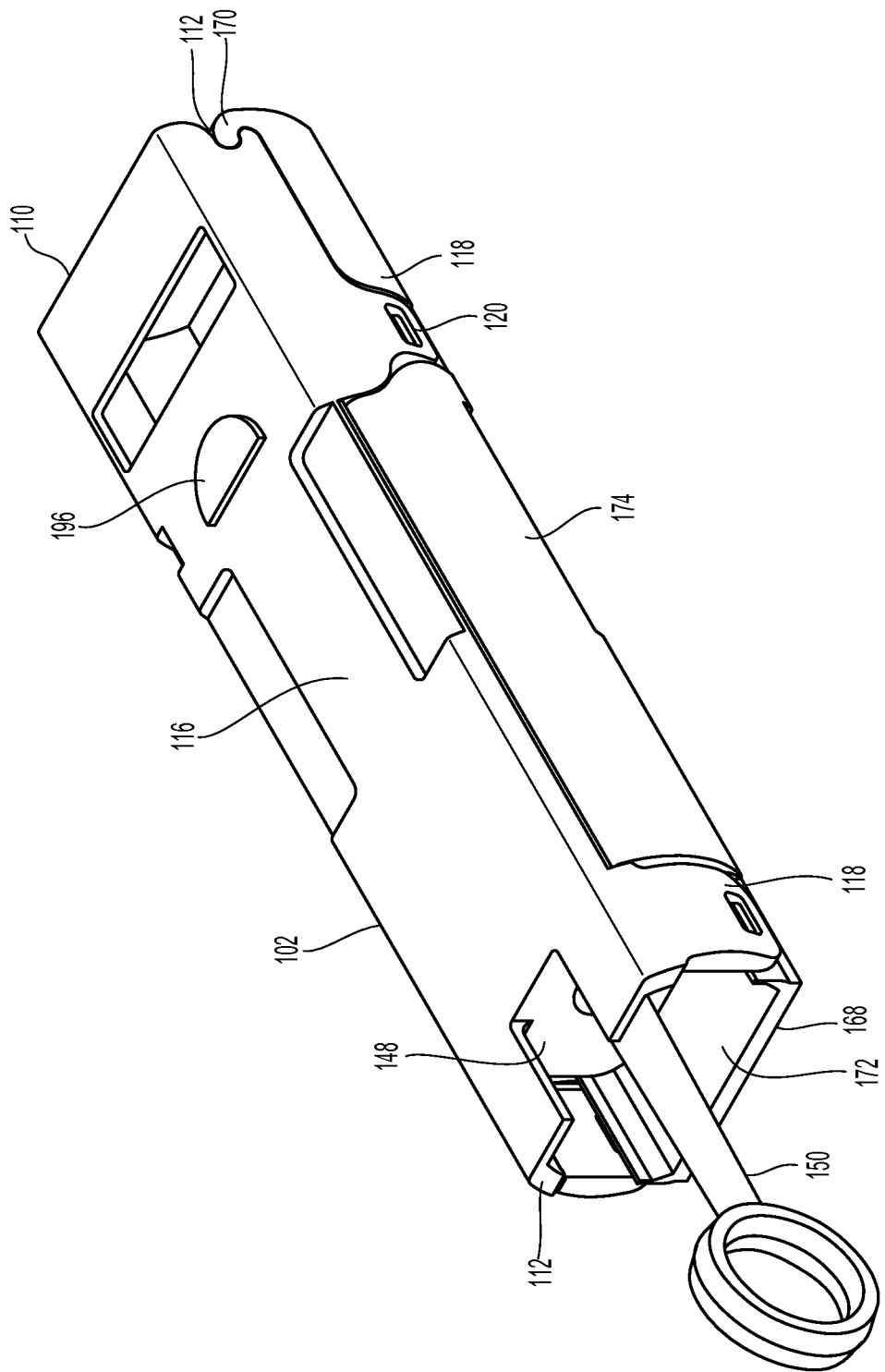
FIG. 6 is a rear perspective view of the loopback housing of FIG. 1.
Figure 7:
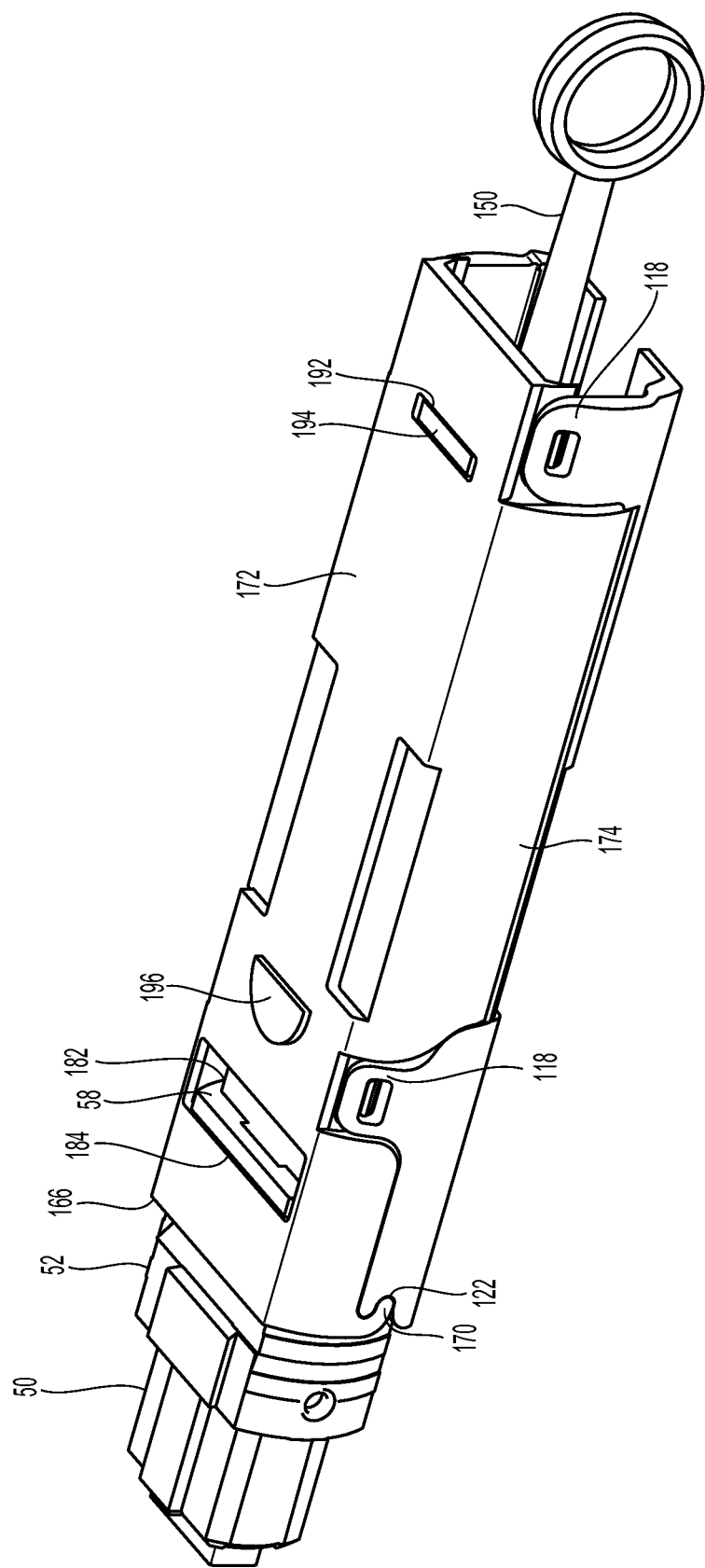
FIG. 7 is a side perspective of the loopback housing of FIG. 1 illustrating the engagement of the outer housing of the fiber optic connector.
Figure 8:
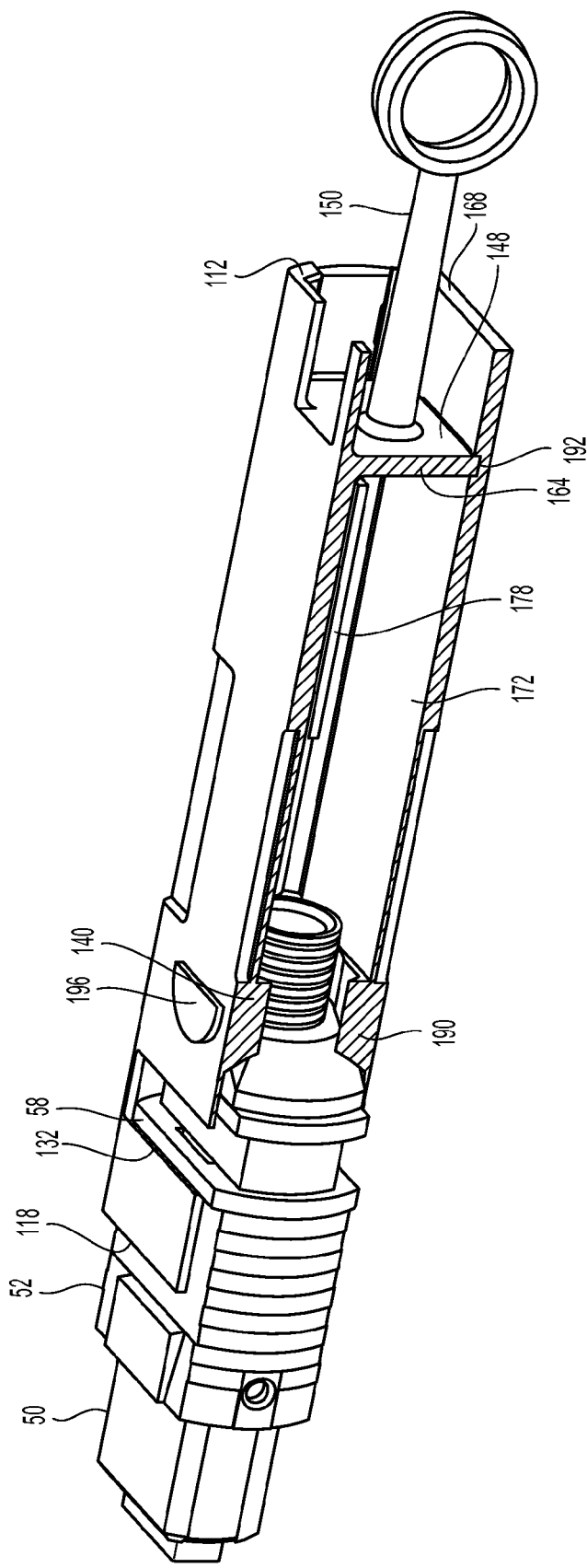
FIG. 8 is a cross sectional view of the loopback housing and fiber optic connector of FIG. 7 (with the optical fibers removed for clarity) illustrating the engagement of the loopback housing with the fiber optic connector during insertion into an adapter.

The upper body portion 102 has at least one interior extension 140 that extends from the internal surface 114 to engage the fiber optic connector 50. See FIGS. 4 and 8. The at least one interior extension 140 makes contact with the back of the fiber optic connector 50 and when the loopback housing 100 is pushed the at least one interior extension 140 engages the back of the fiber optic connector 50 or inner sleeve or housing 54. This prevents the need of the installer from trying to install the fiber optic connector 50 without interfering with the optical fibers 56.

The upper body portion 102 has an inward extending portion 146 that extends from the internal surface 114. See FIG. 9. The inward extending portion 146 also acts as a rear wall for the loopback housing 100 as described in more detail below with regard to the lower body portion 104. The inward extending portion 146 has a rearward facing surface 148 and a handle 150 that extends from the rearward facing surface 148. The handle 150 is used to install and remove the loopback housing 100 and the fiber optic connector 50. The handle is illustrated as being attached to or emanating from the rearward facing surface 148, but it could come from the upper body portion 102 directly or other parts of the loopback housing 100 and still be within the scope of the present invention.

Figure 3:
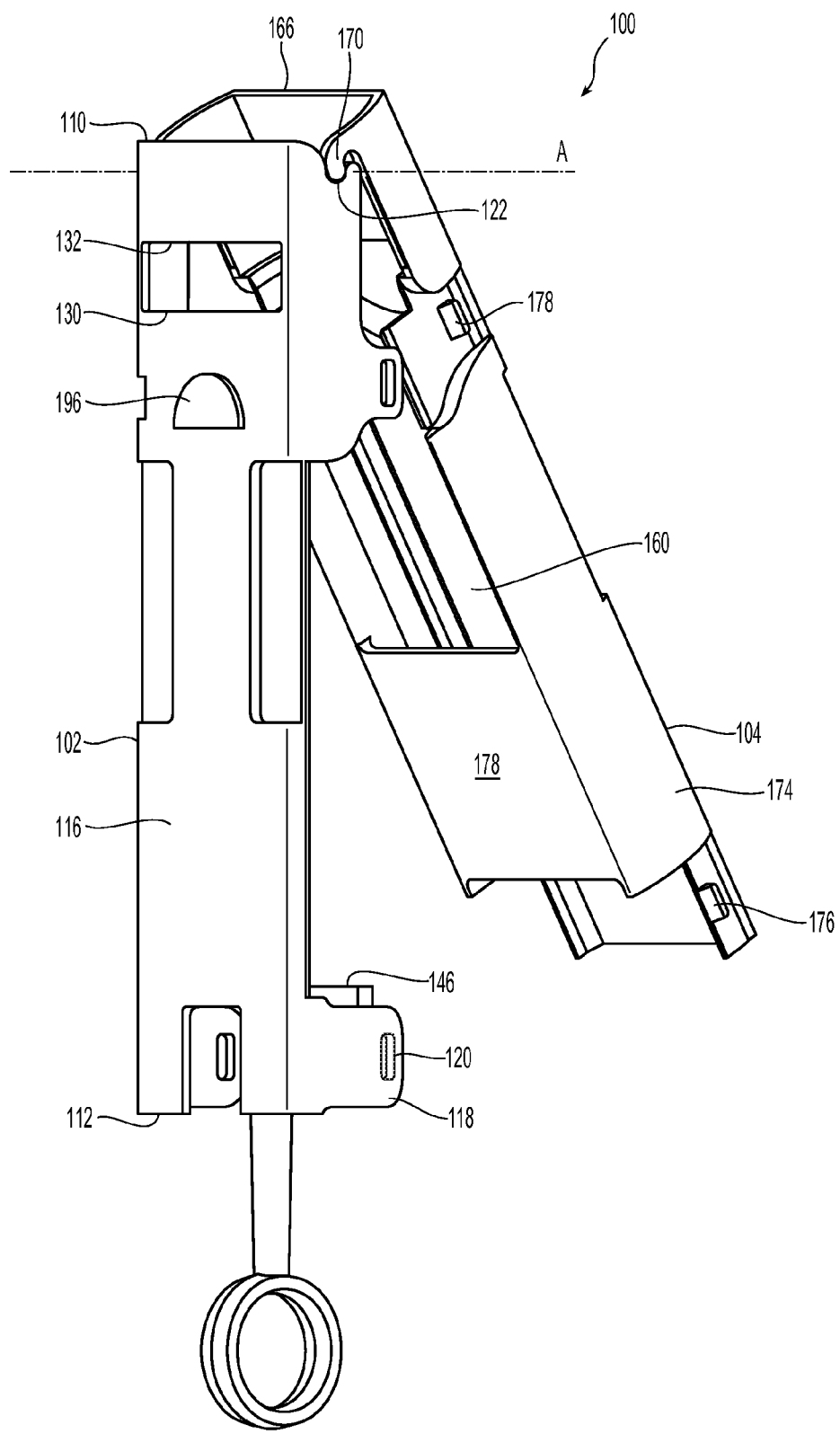
FIG. 3 is a perspective view of the loopback housing of FIG. 1 in a partially open position with the fiber optic connector removed for clarity.

The lower body portion 104 is connectable to the upper body portion 102 and has an internal surface 160, an external surface 164, a front end 166, and a back end 168. The front end 166 has two projections 170, with a configuration that corresponds to the indentations 122. The projections 170 are on either side of the lower body portion 104 to engage the indentations 122 on the upper body portion 102 and allow the lower body portion 104 and the upper body portion 102 to rotate relative to one another about an axis A as illustrated in FIG. 3. To connect the upper body portion 102 to the lower body portion 104, the projections 170 are inserted into the indentations 122 and then the two body portions are properly aligned to be secured to one another. The lower body portion 104 has a bottom wall 172 and two side walls 174 on opposite sides of the bottom wall 172. The side walls 174 do not extend the entire length of the bottom wall 172 but they could if so desired. The side walls 174 have projections 176 near the front end 166 and the back end 168 to correspond to the openings 120 on the upper body portion 102. It should be noted that the openings 120 and the projections 176 could be reversed, with the projections on the upper body portion and the openings on the lower body portion. The portion of the side walls 174 where the projections 176 are located are preferably recessed relative to the other areas in the side walls 174 so that the loopback housing 100 has an integral and flush profile.

The lower body portion 104 also has a top wall 178 that is connected to the side walls 174 opposite the bottom wall 172 to form a fiber opening 180. Fiber opening 180 is where the optical fibers 56 from the fiber optic connector 50 are stored and protected from outside forces. The top wall 178 need not extend the entire length of the lower body portion 104. In fact, if it were to extend the entire length of the lower body portion 104, it would be difficult, if not impossible, to position the optical fibers 56 in the fiber opening 180.

The lower body portion 104 also has has an opening 182 adjacent the front end 166. The position of the opening 182 is the same as in upper body portion 102 and also corresponds to the outer housing 52 and particularly an upward projection portion 58 of the outer housing 52, but on the opposite side of the fiber optic connector 50. The opening 182 has a rearward facing surface 184 that engages the upward projection portion 58 of the outer housing 52 when the loopback housing 100 is pulled since the loopback housing moves relative to the fiber optic connector 50 and the outer housing 52. The rearward movement of the outer housing 52 allows the fiber optic connector to be removed from an adapter.

Also, the rearward facing surface 184 need not be associated with an opening 182 as illustrated. Rather, it could project from the internal surface 160 as a rib, a point, or be in any other form to engage and push on the the upward projection portion 58 of the outer housing 52. The lower body portion 104 has at least one interior extension 190 that extends from the internal surface 160 to engage the fiber optic connector 50. See FIGS. 5 and 8. This interior extension 190 functions in the same way as the one in the upper body portion 102: the at least one interior extension 190 makes contact with the back of the fiber optic connector 50 and when the loopback housing 100 is pushed the at least one interior extension 190 engages the back of the fiber optic connector 50 or inner sleeve or housing 54. The loopback housing 100 may have only one of the one interior extensions 140, 190, as one would be able to apply sufficient pressure on the back of the fiber optic connector 50 to engage it in the adapter.

The lower body portion 104 also has has a rear opening 192 that corresponds to the inward extending portion 146. See FIGS. 5 and 8. The length of the inward extending portion 146 allows for the end 194 extend into (and may even extend through) the rear opening 192. The engagement of the inward extending portion 146 with rear opening 192 provides support and strength to the inward extending portion 146 for pulling on the loopback housing 100 and the handle 150. The inward extending portion 146, also positioned to engage the rear opening 192, functions as a rear wall for the fiber opening 180 and encloses the fiber opening 180. It should be noted that a rear wall is not necessary for operation of the loopback housing 100 and the protection of the optical fibers 56, but provides an extra amount of protection for the optical fibers 56 and a base for the handle 150. The handle 150, however, could be attached to or emanate from another part of the loop back housing 100, such as the upper body portion 102 or the lower body portion 104. The handle 150 may have other configurations and lengths as needed for use within the environment in which the loopback housing is being used.

The loopback housing 100 may also have a key 196 on either one of or both of the upper body portion 102 and lower body portion 104 to allow the user to correctly orient the fiber optic connector 50 and the loopback housing 100 in the environment they are being used.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A loopback housing to be attached to an outer portion of a fiber optic connector to protect optical fibers extending from a rear portion of the fiber optic connector, the optical fibers having two ends, both of the ends of the optical fibers terminating within a ferrule disposed within the fiber optic connector, and the fiber optic connector having an inner sleeve and an outer sleeve, the inner and outer sleeves being movable relative to one another, comprising:
- an upper body portion having an internal surface, an external surface, a front end, and back end;
- a lower body portion connectable to the upper body portion and having an internal surface, an external surface, a front end, and back end;
- at least one interior extension extending from the interior surface of at least one of the upper body portion and the lower body portion to engage the inner sleeve of the fiber optic connector;
- at least one of the upper body portion and the lower body portion having at least one rearward facing surface to engage the outer sleeve of the fiber optic connector; and
- a handle extending from a portion of the housing away from the front end and beyond the back end of the upper body portion and lower body portion, wherein the front end of the upper body portion and the front end of the lower body portion form an opening at the front end thereof, the fiber optic connector extending beyond the front ends of the upper and lower body portions.

2. The loopback housing according to claim 1, wherein at least one of the upper body portion and lower body portion has an opening and the at least one rearward facing surface comprises one side of the opening.

3. The loopback housing according to claim 1, wherein the upper body portion and the lower body portion are removably connectable to one another.

4. The loopback housing according to claim 1, wherein the upper body portion has an inward extending portion disposed adjacent the back end, the handle emanating from the inward extending portion and away from the loopback housing.

5. The loopback housing according to claim 4, the inward extending portion engages the lower body portion to provide support for the handle.

6. The loopback housing according to claim 4, wherein the lower portion has a rear opening adjacent the back end and the inward extending portion is configured to be disposed within the rear opening upon connecting the upper body and lower body portions together.

7. The loopback housing according to claim 1, wherein the lower body portion has a bottom wall, a side wall disposed on opposite sides of the bottom wall, and a top wall, the top wall connecting with the two side walls opposite the bottom wall to create a fiber opening along a portion of the lower body portion to house the optical fibers.

8. The loopback housing according to claim 7, wherein the upper body portion has an inward extending portion disposed adjacent the back end, the inward extending portion disposed at an end of the opening adjacent the back end thereof when the upper and lower body portions are connected to one another.

9. The loopback housing according to claim 1, wherein the loopback housing is removably attached to the fiber optic connector.

10. The loopback housing according to claim 1, wherein the loopback housing slides forward and backward relative to the fiber optic connector.

11. The loopback housing according to claim 1, wherein the at least one interior extension engages the inner housing of the fiber optic connector when the sleeve is pushed in a forward direction.

12. The loopback housing according to claim 1, wherein the at least one rearward facing surface engages the outer housing of the fiber optic connector when the loopback housing is pulled in a backward direction.

13. The loopback housing according to claim 1, wherein at least one of the upper body portion and lower body portion has a key to provide for orientation of the loopback housing.

14. The loopback housing according to claim 1, wherein one of the upper body portion and the lower body portion has indentations at the front end and the other of the upper body portion and the lower body portion having projections at the front end thereof, the projections engaging the indentations to form an axis about which the upper body portion and the lower body portion rotate during assembly.

* * * * *